L. CHESLEY.
Carriage-Shafts.
No. 150,134. Patented April 28, 1874.
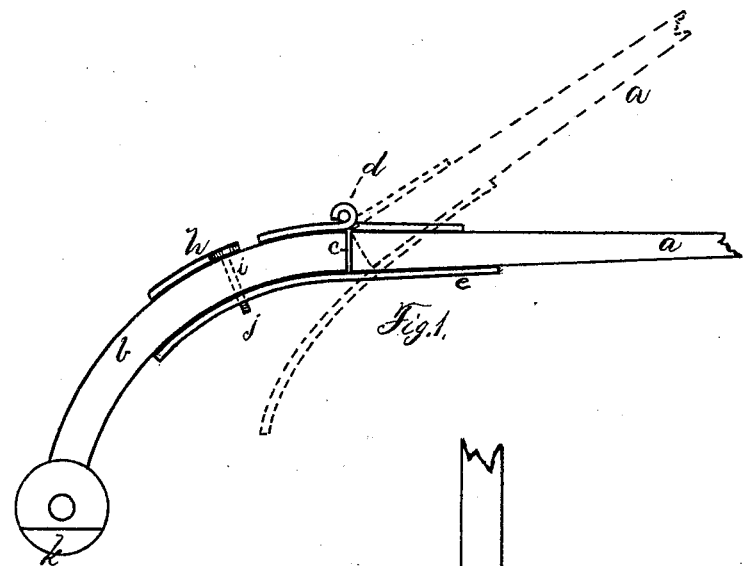
Fig. 1.
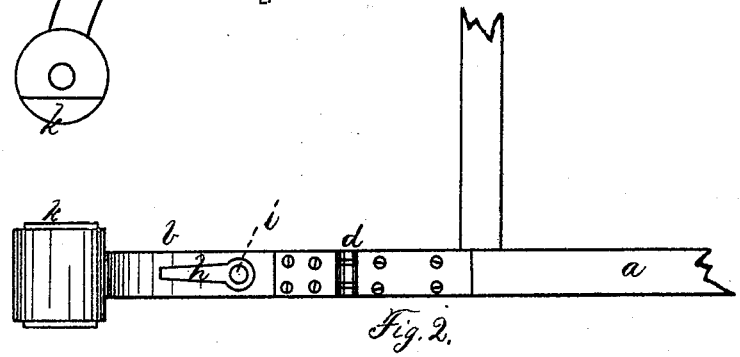
Fig. 2.
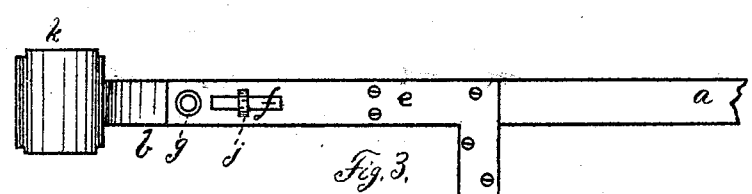
Fig. 3.
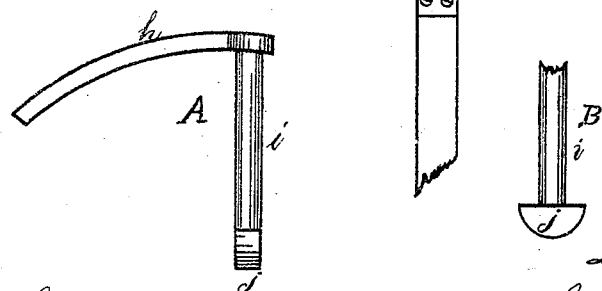

UNITED STATES PATENT OFFICE.

LORENZO CHESLEY, OF WEST MOUNT VERNON, MAINE.

IMPROVEMENT IN CARRIAGE-SHAFTS.

Specification forming part of Letters Patent No. 150,134, dated April 28, 1874; application filed February 9, 1874.

*To all whom it may concern:*

Be it known that I, LORENZO CHESLEY, of West Mount Vernon, in the county of Kennebec and State of Maine, have invented certain new and useful Improvements in Carriage-Shafts; and I do hereby declare that the following is a full, clear, and exact description thereof, that will enable others skilled in the art to which it appertains to make and use the same, reference being had to the accompanying drawings and to the letters of reference marked thereon, which form a part of this specification.

Figure 1 is a side view of my invention. Fig. 2 is a top-plan view of the same. Fig. 3 is a bottom view.

Same letters show like parts.

My invention relates to certain improvements in shafts of sleighs and other carriages; and has for its object to permit of the turning back of the shaft, when the vehicle is not in use, upon the body of the same, in order that the vehicle may occupy as little space as possible upon the floor of the stable or carriage-house. It also has for its object the making of the bent portion of the shaft, or that part which is next to the body of the vehicle, of metal. With this change a shaft can be more cheaply manufactured, and be stronger.

$a$ shows the straight part of the shaft; $b$, the bent portion. I make my improved shaft in two parts, the section being at $c$. These two parts are united by the hinged plate $d$, bolted to the top side of the two parts $a$ and $b$. The joint is further strengthened by a tenon and socket. On the under side of the shaft $a$ is bolted a plate, $e$, which extends down on the under side of the curved part $b$, having a slot, $f$, and a hole, $g$. This plate conforms to the curvature of the part $b$. Upon the upper side of the part $b$ is seen a short lever, $h$. This is connected with a bolt, $i$, passing through the curved part $b$ and into the slot $f$ in the plate $e$. This bolt $i$ has on the under side a head or catch, $j$, which extends across the slot $f$. When the lever $h$ is so turned as to keep this catch or head across the slot $f$, then the entire shaft is held rigidly. When the bolt is so turned by the lever that the catch will slip through the slot $f$, the part $a$ of the shaft can then be turned back, as indicated by the dotted lines in Fig. 1, where the shaft is shown as being partly raised. A suitable material of which to form the bent portion $b$ is cast malleable iron. If desired, on the end of the lever there can be a point to fit a recess on the bent portion, and thus hold it (the lever) in secure position. $k$ is a lip or projection on the end of the bent portion, where it is united to the axle-tree, for the purpose of preventing the bent portion from dropping downward. This lip bears against the two lugs or projections on the axle-tree, and thus prevents the bent portion from dropping downward when the shafts are thrown back. A and B are details showing the form of the lever and catch.

What I claim as my invention, and desire to secure by Letters Patent, is—

A shaft composed of the two parts $a$ and $b$, united by the hinged plate $d$, and having the plate $e$, lever $h$, bolt $i$, and catch $j$ to work in the slot $f$, all combined to operate as described.

In testimony that I claim the foregoing, I have hereunto set my hand this 3d day of February, 1874.

LORENZO CHESLEY.

Witnesses:
JAMES S. PIKE,
M. ANNHING.